Aug. 23, 1938.  H. J. FOWLER  2,127,724
LOBBY DISPLAY MACHINE
Filed May 11, 1936  3 Sheets-Sheet 1

HERMAN J. FOWLER
INVENTOR.

BY
ATTORNEY.

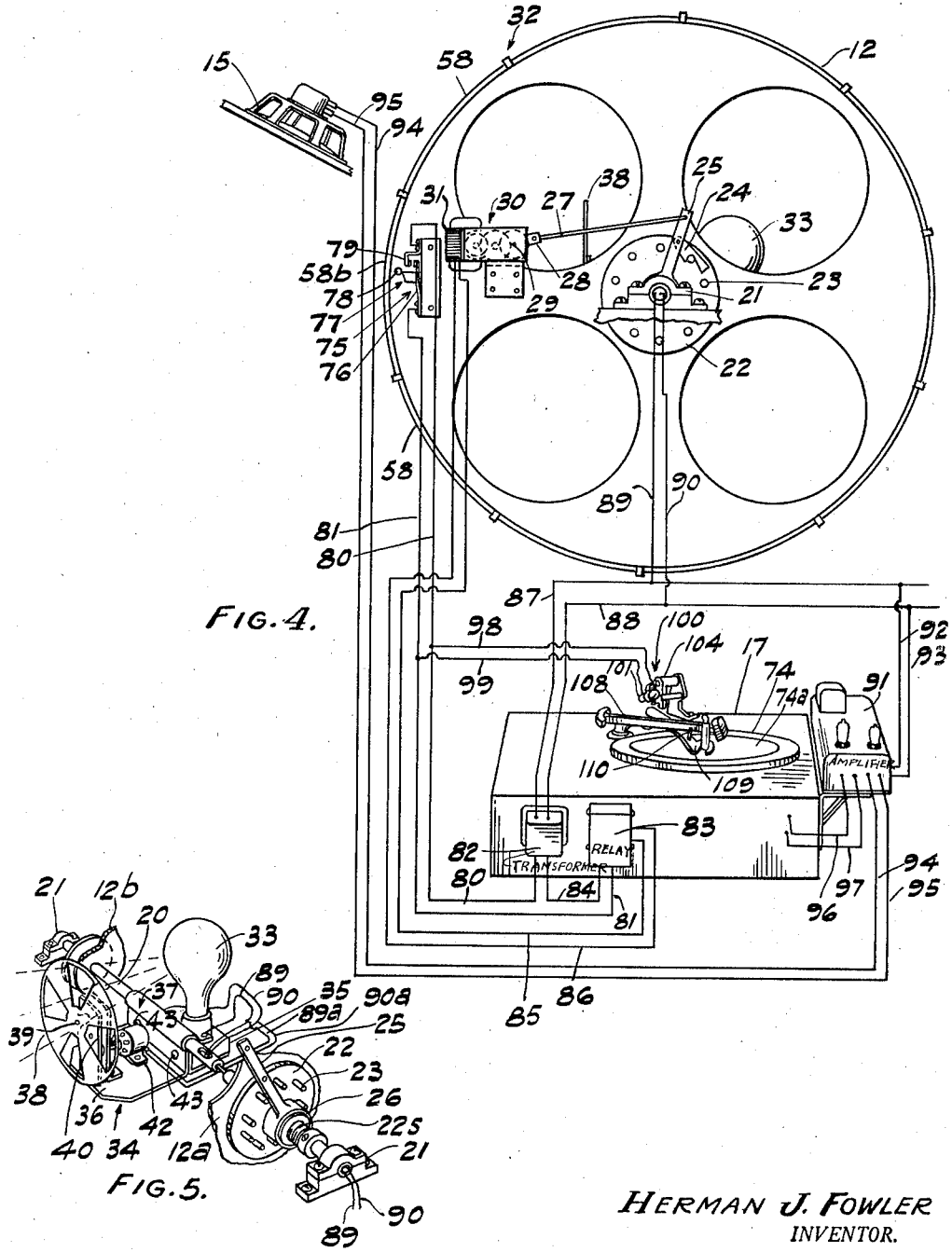

Aug. 23, 1938.                H. J. FOWLER                2,127,724
                         LOBBY DISPLAY MACHINE
                         Filed May 11, 1936          3 Sheets-Sheet 3

HERMAN J. FOWLER
INVENTOR.
BY
ATTORNEY.

Patented Aug. 23, 1938

2,127,724

UNITED STATES PATENT OFFICE 2,127,724

LOBBY DISPLAY MACHINE

Herman J. Fowler, Los Angeles, Calif., assignor to Photo-Vox, Inc., a corporation of Illinois Application May 11, 1936, Serial No. 79,067

3 Claims. (Cl. 40—28)

The present invention relates to apparatus for displaying step by step a series of rotatably mounted photographs or transparencies in combination with means to produce synchronized sound effects, or accompanying talks for advertising and other purposes, objects of the invention being to provide—

A novelly constructed lobby display including a drum on the circumferential portion of which are provided improved means for detachably mounting in an overlapping manner a plurality of photographs or transparencies against which a beam of light is directed, whereby onlookers viewing the display are enabled to grasp all the visual characteristics possessed by such photographs or transparencies;

Improved means for displaying a cyclic series of recurring photographs, transparencies or the like in combination with a step by step series of accompanying sound effects wherein auxiliary means are provided for giving an animated effect to such showing of a photograph or transparency, while it is being maintained for a few seconds, or longer, in a stationary, illuminated position;

Improved means for automatically displaying in succession a series of photographs in conjunction with improved means for resynchronizing the picture and sound effects at each re-occurrence of the showing.

Further objects include the provision of a device for displaying hand colored photographs or transparencies in succession wherein the photographs can be manually attached and detached as the displaying of other photographs or transparencies are taking place;

The provision of apparatus of the character hereinbefore stated wherein a constantly repeating display apparatus is operated in synchronism with sound effects provided with improved means for reactuating a recurrence of the cyclic display after the moving of the same has been temporarily obstructed;

The provision of a portable animated talkie lobby display which is simpler, more easily changed, operated, and installed.

Yet another object of the invention is to provide, in combination with other novel features, a simplified and more readily adjusted means to support the lamp which illuminates the pictures, and to accurately direct the rays from said lamp upon the particular picture being displayed.

Yet still another object of the invention is to provide improved means for continuously displaying a series of photographs, transparencies or film without any interruptions during the cycle of display, in synchronization with a sound accompaniment therefor.

In the preferred embodiment of my lobby display apparatus now reduced to practice and illustrated in the accompanying drawings—

Fig. 4 is a diagrammatical view showing a fragmentary portion of the display apparatus in side elevation and the sound reproducing and reactuating mechanism in perspective together with the wiring whereby the various operating mechanisms are connected to a source of supply not shown.

Fig. 5 is a fragmentary perspective view of a part of the apparatus including an intervening shutter motor operated mechanism which cooperates therewith whereby the photograph or transparency displayed is given an animated effect.

Figure 2:
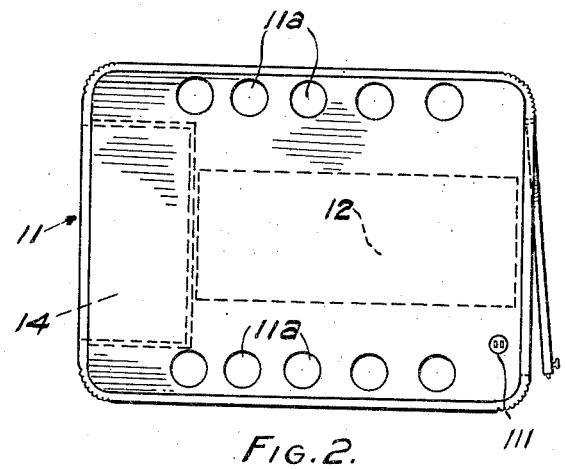
Fig. 2 is a top plan view.
Figure 1:
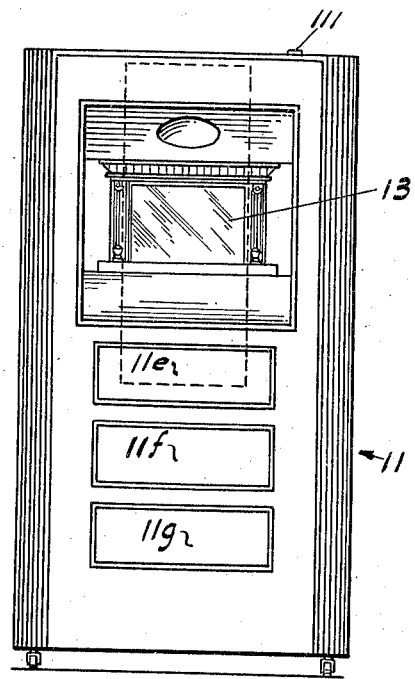
Fig. 1 is a front elevation.

Referring in detail to the drawings, in the upper portion of the rectangular cabinet 11 is mounted a picture drum 12, to rotate in a vertical plane opposite to a window 13, located at the inner end of a recess or alcove 14 with which one side of the cabinet is provided. Said alcove 14 is preferably provided with converging upper and lower walls, and in the upper wall thereof there is provided an opening above which is located a loud speaker 15 which is electrically connected with the phonograph 17 and directs sound descriptive of the pictures downwardly into said alcove. At the opposite side of said cabinet an opening is provided of sufficient size to enable the attendant to insert new pictures and attach them to the drum 12, said opening being guarded by a swingable or other door 16.

As shown in Figs. 4 and 5 the drum 12 is mounted upon a tubular shaft 20, drum head portions 12a and 12b being shown in Fig. 5, and one of the end bearings 21 of said shaft 20 being shown in Fig. 4, it being understood that said bearings are supported in any suitable manner upon the inner faces of the side walls of the cabinet 11.

To the center of the drum head 12a is attached an operating disk 22 which is furnished with a circularly arranged series of ratchet lugs or pins 23, and with these pins cooperate a pawl 24, said pawl having, beyond its tooth engaging part, an extension to support it while it is being retracted from one tooth to the next. The pawl is pivotally attached to an operating arm 25, said arm having its lower end furnished with an annular head 26 whereby it is journalled upon the adjacent end portion of the shaft 20. To the upper and outer end portion of said arm is connected one end of a link 27, said link having its opposite end connected with a crank arm 28, which is caused to rotate by reason of being secured to a pintle 29 in fixed relation to the shaft of the final gear of a train of gearing 30 which is driven by a motor 31. Overrotation of the disk 22 is prevented by a compression spring 22s which is coiled around the shaft 20 and which frictionally engages the head 26 of the arm 25.

Along the periphery of the picture drum 12 are arranged a series of picture holding devices 32, ten being shown in the drawings. These picture holding devices enable the attendant to quickly and easily attach or detach the individual photographs or transparencies through which the light is to be projected in order to render these pictures visible in an attractive manner through the window 13. Light for this purpose is supplied by a lamp 33 which is supported by a bracket 34. Said bracket 34 is preferably made of two horizontal metal wings 35 and 36 having abutting upwardly directed portions secured to each other in such a way as to form a clamp 37 which grips the hollow stationary shaft 20, see Fig. 5.

In order to cause the light from said lamp to encounter each picture in a flickering manner to simulate the appearance of pictures displayed by a motion picture apparatus, a segmentally apertured shutter disk 38 is rotatably mounted between said lamp and the picture against which the light is projected. Said disk is fixed to a pintle 39 having its bearings within a frame 40 wherein is mounted gearing 41 driven by a motor 42. The parts just described are all supported by the bracket 34. By loosening the clamp screws 43 said bracket can be rotationally adjusted with relation to the shaft 20 to which it is secured.

The drum heads 12a and 12b are each furnished with a continuous, peripheral outwardly directed flange 50 which is L-shaped in cross section, the off-set portion 51 of each of these flanges being directed radially away from the center of the drum thus providing a two-part circumferential seating surface to which is secured, for example by screws 52, the peripheral transparent drum band 53, which underlies and aids in supporting the attached pictures.

A set of properly spaced peripherally located cross bars 55 having end flanges 56 to receive screws 56s stabilize the drum structure.

Figure 8:
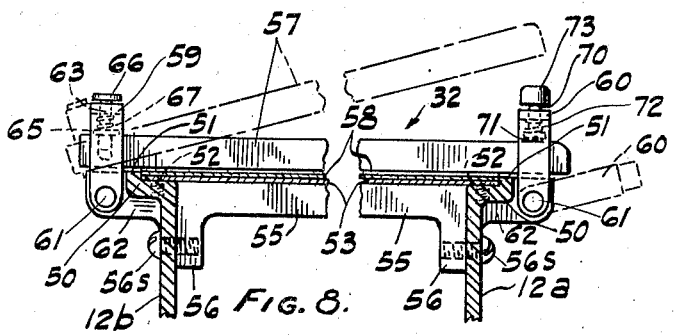
Fig. 8 is a section taken on the plane of 8—8 through Fig. 7.
Figure 7:
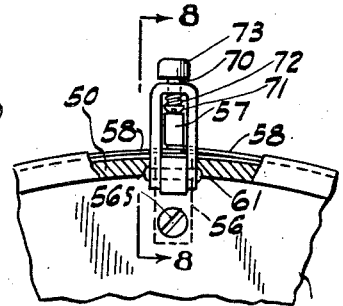
Fig. 7 is an enlarged fragmentary side view of one of the picture clamping mechanisms.

In radial outward alinement with each of said cross bars is a clamping bar 57 which clamps in place the overlapping portions of adjacent picture plates 58, as shown in Figs. 7 and 8. The end portions of said bar 57 are retainable in place by means of the two stirrups 59 and 60 which are fastened by pivots 61 to exterior lugs 62 which may be cast upon the drum heads. The inner end of the stirrup pin 63 loosely enters a socket provided therefor in the adjacent end portion of the bar 57, thus permitting said bar to tilt up to the dotted line position of Fig. 8 when new pictures are to be inserted. Said pin has a collar 65 in fixed relation thereto, and a head 66 which is screwed onto the pin after it is put in place. A compression spring 67 completes this part of the structure.

At the opposite end of each bar 57 the stirrup 60 is furnished with a pin 70 having an inner head 71 pressed upon by a spring 72, the outer head 73 of said pin being screwed thereonto.

In order to produce a sound accompaniment for each picture during the interval that it is on display through the window 13, the sound-reproducing structure or phonograph 17 shown in the lower portion of Fig. 4 is provided, the casing of which contains an electrically operated mechanism (not shown) which rotates the sound record disk 74. Said disk 74 carries a sound record 74a sufficiently extensive to describe, one after another, an entire set of pictures mountable upon the drum 12.

Certain electrical connections, which will presently be described, are controlled by means of a switch 75 the movable contact arm 76 of which carries a cam lug 77 the cam face of which is in the path of a stud 78 carried by drum 12 near its periphery and gyrated in a clock-wise direction thereby. Said switch arm 76 is resilient and normally presses the contact with which it is furnished into engagement with the stationary contact which is carried by the stationary switch arm 79.

Switch 75 controls the current through wires 80 and 81 which respectively run to transformer 82 and relay 83. A low voltage current is conveyed from said transformer to said relay by a wire 84. The drum operating synchronous motor 31 receives its current through wires 85 and 86 the current through which is controlled in a well known manner by the relay 83. The transformer 82 is supplied with current by the wires 87 and 88, with which are respectively connected wires 89 and 90. The amplifier is supplied by wires 92 and 93 and from it wires 94 and 95 lead to the loud speaker 15. Wires 96 and 97 connect the amplifier to the phonograph 17.

The wiring for the motor 42 includes leads 89a and 90a which are respectively connected with the wires 89 and 90 that supply current to the lamp 33.

Figures 9, 10:
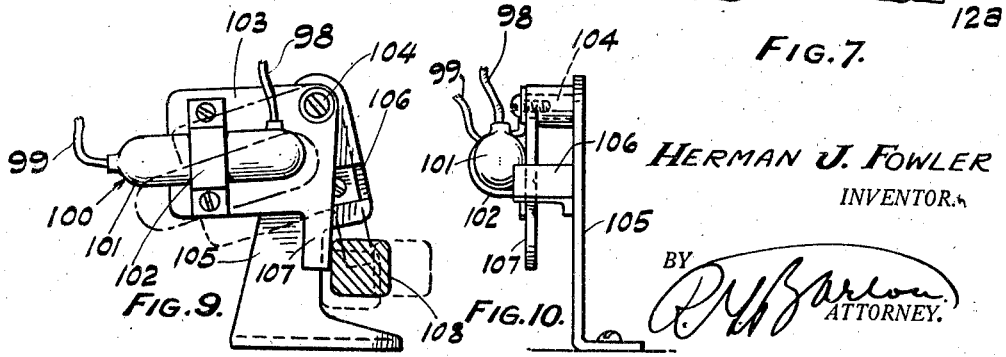
Fig. 9 is a side elevation of a mercury switch and its mounting means, said switch being located adjacent to the phonograph shown in the lower portion of Fig. 4.
Fig. 10 is an end elevation of the structures shown in Fig. 9.

In addition to the current conducting wires that have been described there are shown in Fig. 4 wires 98 and 99 which respectively connect the leads 80 and 81 with a mercury switch 100. (See Figs. 9 and 10.) The elongated casing 101 of this switch is secured by a clip 102 to a swinging hanger or plate 103, a pivot means 104 fastening an upper corner portion of said plate to a small standard or post 105. A stop 106 on said post stops the swing of the casing 100 and its hanger in a position wherein said casing is sufficiently inclined to cause the mercury therein to open the circuit through the switch.

The swingable hanger 103 is furnished with a downwardly directed operating lug 107 which, at a certain stage in the operation of the phonograph is engaged by its stylus-carrying arm 108. With said stylus-carrying arm cooperate the usual automatic arm shifter 109 and its vertical lever 110.

Figure 6:
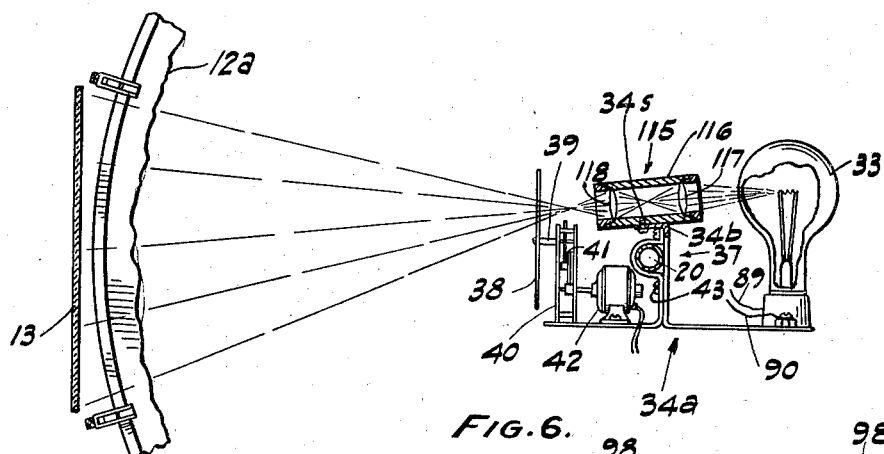
Fig. 6 is an enlarged fragmentary side elevation showing the means to shutter the rays of the light on the photograph to produce an animated effect on the adjacent screen, there being included an intervening condenser for the light rays transmitted.

It is optional to use a light condensing device 115, which is shown in Fig. 6 and which consists of a tubular casing 116 containing the doubly convex lenses 117 and 118. Said condensing device is located between the lamp 33 and the upper portion of the rotatable apertured disk 38. In order to support said device a bracket 34a, slightly modified from the bracket 34 shown in Fig. 5, is made use of, a rest 34b being provided at the top of said bracket to which the condenser casing is secured by means of one or more screws 34s.

Figure 3:
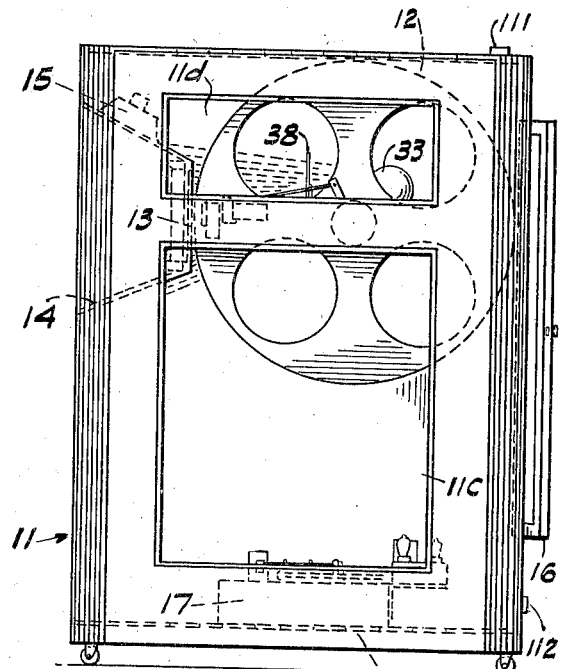
Fig. 3 is a side elevation.

Referring to additional details of construction, the cabinet 11 is shown furnished in its top with a row of vents 11a near each side thereof and with a floor 11b which also has vents therethrough. Windows 11c and 11d are provided in each side of the cabinet, one set of these windows being shown in Fig. 3. In the front of the cabinet the windows 11e, 11f and 11g are located below the window 13.

Suitable electric outlets 111, and 112 are also furnished.

The transparent band 53 around the drum 12 may be made of Celluloid. If desired, instead of superimposing a series of separate picture plates upon said band 53, a single picture film may be placed in this situation and a series of pictures thereon may be successively displayed by the machine in the same manner as the picture plates already described. When such a continuous picture film is used the end portions thereof will appear as indicated at 58, 58 in Fig. 7, and since there will be only one overlap, it will be necessary to make use of only the one clamping device shown in said view. The width of said picture film should be the same as that of the band 53.

The operation is as follows:

The ten picture plates to be displayed are first attached to the drum in their proper sequence, the clamping bars 57 being first swung outwardly from the drum and then, after adjacent picture plates have been put in place in the proper positions, said bars are individually swung down against the overlap between adjacent picture plates and while the operator retracts the spring-pressed bolt heads 71, the stirrups 60 are swung back over the free ends of said bars. The current is then turned on with the drum in its proper rotational position with regard to the position of the stylus of the phonograph.

In order to introduce an explanation of the automatic electric controls let it be assumed that picture 58 is moving upwardly and that it has not quite reached the position in which it is shown on Fig. 4. At such time motor 31 is running, switch 75 is closed, mercury switch 100 is open, arm 108 is nearly at the center limit of the record and stud 78 is just starting to open switch 75.

The following then occurs: Switch 75 is opened by stud 78, shutting off the low voltage current running from the transformer to the relay. The relay then shuts off the 110 volt current to motor 31 and said motor stops.

The operation of the relay is practically instantaneous so that now the following conditions exist: Drum 12 is standing still and so is stud 78. Said stud is holding switch 75 open and the ratchet arm 25 and pawl 24 are in the positions shown in Fig. 4. The record disk 74a is still turning but there is no talking, only music, if that is desired.

Figure 11:
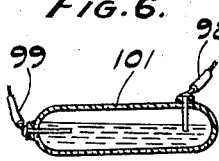
Fig. 11 is a longitudinal section of the casing of the mercury switch of Figs. 8 and 9, said casing being shown in the position which it assumes when in the circuit-closing position.
Figure 12:
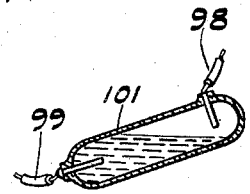
Fig. 12 shows the switch casing of Fig. 11 in the positions it occupies when the switch is open.

The following then occurs: Arm 108 comes to the end of the record and strikes the vertical lever 110. This causes automatic arm shifter 109 to rise and arm 108 lifts, then slides back toward the outside of the record and hits the pivot plate 103, (see Fig. 9). Thus by pushing the plate 103 it changes the position of the mercury switch from that of Fig. 12 (shown dotted in Fig. 9) to that of Fig. 11 (shown full in Fig. 9) thereby closing the circuit connecting transformer to the relay. Then the relay closes the 110 volt circuit to the motor 31 and said motor starts running even though switch 75 is still held open by the stud 78. While the relay is closing the circuit, arm 108 reaches the upper dotted position, Fig. 9. Then the arm is stopped from moving because it engages the standard 105. At about the same time shifter 109 (Fig. 4) has lowered again and repeater arm 108 has moved down to its lower dotted position (Fig. 9) and contacts the record again. The following conditions now exist: Switch 75 is still open, drum 12 and its stud 78 are at a standstill, ratchet arm 25 and pawl 24 are being retracted, the record is starting to play and describe picture 58b, mercury switch 100 being still closed because arm 108 is still in contact with the pivot plate 103.

Now arm 108 will slowly move away from said plate, which swings to the right (Fig. 9) until it engages the stop 106. The switch opens just before arm 107 reaches said stop, but during the swing of said plate towards said stop motor 31 is moving the pawl-carrying arm 25 to the left, and before switch 100 breaks the circuit motor 31 has time to begin advancing pawl 24 thereby starting to move the drum 12 again and as soon as this occurs stud 78 of said drum permits switch 75 to close. Of course, after said switch closes again, it does not matter at what time the mercury switch 100 opens because the motor is being supplied with current and will therefore keep right on running till stud 78 comes around again.

Because of arm 108 moving very slowly while the phonograph is playing, the switch 100 remains closed for an interval thus allowing plenty of time for the ratchet arm 25 to move to the left preparatory to engaging the next pin 23.

It should be understood that the present disclosure is for the purpose of illustration only and that this invention includes all modifications and equivalents which fall within the scope of the subject matter claimed.

What is claimed is:

1. In an apparatus of the character described, supporting means, a drum rotatably mounted thereon, a series of pictures mounted on said drum, a motor, means operatively connected with said drum to rotate the same in a step by step manner with intervening rest periods to bring said pictures successively into a display position, a phonograph having a record disk whereon is recorded matter descriptive of said series of pictures whereby said pictures are described according to the sequence in which they are displayed by the rotation of said drum, a motor to rotate the record disk of said phonograph, circuit controlling means to open and close a circuit through the motor which operates said drum, a mercury switch which forms a part of said circuit controlling means, and which is pivotally mounted to gravitate from the closed to the open position, there being an operative connection between said mercury switch and the stylus carrying arm of said phonograph whereby, when said arm returns to the outside of the record disk said mercury switch is operated to cause renewed rotation of said drum thereby to synchronize the step by step rotation of said drum with the audible descriptions given by said record disk of the individual pictures being displayed.

2. In an apparatus of the character described, supporting means, a drum rotatably mounted thereon, a series of pictures mounted on said drum in a circumferential sequence with relation thereto, a motor operatively connected with said drum to rotate it thereby to bring said pictures sequentially into display positions, a phonograph having a record on which is recorded a sound accompaniment sequentially arranged for said pictures, said phonograph including a motor to operate it, a normally closed switch mounted near said drum, said drum being provided with means whereby at one point in its rotation it opens and for a brief interval maintains open said switch, a self-opening phonograph switch which said phonograph automatically closes for a brief interval each time its stylus-carrying arm returns to the outside of the record, a relay, and wiring whereby said motors, switches and relay are electrically connected with each other, said relay being controlled by the drum operated switch and in turn controlling the current through the motor which rotates the drum.

3. The subject matter of claim 2 and, the motor which rotates the drum being connected therewith by a crank-operated pawl and ratchet device whereby said drum is rotated in a step by step manner with a rest interval between each step.

HERMAN J. FOWLER.